(12) United States Patent
Yamada et al.

(10) Patent No.: US 8,136,784 B2
(45) Date of Patent: Mar. 20, 2012

(54) VEHICLE SEAT SLIDE DEVICE

(75) Inventors: Yukifumi Yamada, Toyota (JP); Naoki Goto, Tokai (JP); Shinya Isobe, Nagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/999,247

(22) PCT Filed: Aug. 19, 2009

(86) PCT No.: PCT/JP2009/064515
§ 371 (c)(1),
(2), (4) Date: Dec. 15, 2010

(87) PCT Pub. No.: WO2010/026877
PCT Pub. Date: Mar. 11, 2010

(65) Prior Publication Data
US 2011/0089305 A1    Apr. 21, 2011

(30) Foreign Application Priority Data
Sep. 2, 2008    (JP) .................................. 2008-224346

(51) Int. Cl.
*F16M 13/00*    (2006.01)
(52) U.S. Cl. .................................. 248/424; 297/344.1
(58) Field of Classification Search .................. 248/424, 248/429; 297/344.1, 344.11
See application file for complete search history.

(56) References Cited

U.S. PATENT DOCUMENTS

| | | | | |
|---|---|---|---|---|
| 4,898,356 A | * | 2/1990 | Pipon et al. | 248/429 |
| 5,273,241 A | * | 12/1993 | Droulon | 248/429 |
| 5,275,370 A | * | 1/1994 | Terai | 248/429 |
| 5,286,076 A | * | 2/1994 | DeVoss et al. | 296/65.14 |
| 5,568,908 A | * | 10/1996 | Kisiel | 248/419 |
| 5,775,662 A | * | 7/1998 | Hoshihara et al. | 248/429 |
| 5,806,825 A | * | 9/1998 | Couasnon | 248/429 |
| 5,829,728 A | * | 11/1998 | Hoshihara et al. | 248/429 |
| 5,842,383 A | * | 12/1998 | Yamada et al. | 74/528 |

FOREIGN PATENT DOCUMENTS

| | | |
|---|---|---|
| EP | 0 878 342 A1 | 11/1998 |
| JP | 2000 313260 | 11/2000 |
| JP | 2004 51082 | 2/2004 |
| JP | 2004 114769 | 4/2004 |
| JP | 2006 224912 | 8/2006 |

OTHER PUBLICATIONS

Supplementary European Search Report issued Jan. 26, 2012, in European Patent Application No. 09 81 1404 (Publication No. 2319727).

* cited by examiner

*Primary Examiner* — Amy Sterling
*Assistant Examiner* — Steven Marsh
(74) *Attorney, Agent, or Firm* — Oblon, Spivak, McClelland, Maier & Neustadt, L.L.P.

(57) ABSTRACT

A vehicle seat slide device is provided, wherein a manipulation handle has a grip portion, acting end portions for operating lock/unlock mechanisms, shaft support portions which are between the acting end portions and the grip portion and which are formed to a flat shape to become parallel to vertical walls, and pivot support shafts protruding from the shaft support portions in a direction of the pivot center of the manipulation handle. The vertical walls have opened holding holes which open at front parts and into which the pivot support shafts are inserted from opened portions to be supported at inner parts, and holding members holding the pivot support shafts in the opened holding holds.

4 Claims, 6 Drawing Sheets

VEHICLE SEAT SLIDE DEVICE

TECHNOLOGICAL FIELD

The present invention relates to a vehicle seat slide device provided with a lower rail secured to a floor of a vehicle, an upper rail supported on a seat of the vehicle and supported on the lower rail movably in a front-rear direction and a lock mechanism for locking the movement in a front-rear direction of the upper rail relative to the lower rail, wherein the lock mechanism is operated by a handle.

BACKGROUND ART

In a vehicle seat slide device in Patent Document 1, a lock lever is pivotably carried on a vertical wall of an upper rail, and the lock lever is engaged by the action of a lock spring with claw portions which are provided at an end of an inner lower flange portion of a lower rail, to lock the upper rail relative to the lower rail. On the other hand, a handle attaching portion which is formed bodily with the lock lever is provided close to a lock lever rotational shaft. An end of a handle is inserted into a hole of the attaching portion, and a spring is engaged with a groove formed at an end portion of the handle to prevent the coming-off after the attachment.

Further, in a vehicle seat slide device in Patent Document 2, a manipulation handle is rotatably supported on a lock lever, and an overhang piece for receiving the manipulation handle on the upper side of the same is provided at an upper part of the lock lever and is pivoted together with the handle which is brought into contact with an upper surface of the handle when the manipulation handle is drawn up. Further, a lift-up spring urging downward is arranged at a shaft portion of the manipulation handle to prevent the ricketiness of the manipulation handle.

PRIOR ART DOCUMENT

Patent Document
Patent Document 1: JP2004-114769 A
Patent Document 2: JP2004-51082 A

SUMMARY OF THE INVENTION

Problem to be Solved by the Invention

However, in the vehicle seat slide device in Patent Document 1, for attachment of the manipulation handle, the lock lever is formed to be bent to an approximately U-shape toward the inside of a seat from a position which is along the vertical wall of the upper rail. Thus, a large space is required, and the overlapping of many parts results in a great mass. Further, since in assembling, the handle is required to be inserted into the attaching hole, a problem arises in that a blind work in which the position for insertion is invisible makes the assembling work difficult to do.

Further, in the vehicle seat slide device in Patent Document 2, since the lock lever and the manipulation lever are coupled through a shaft, it is premised that left and right slide structures (upper rails and lower rails) have to be united through the manipulation handle in advance. Therefore, a problem may arise in productivity because the manipulation handle being low in rigidity is liable to be broken or deformed in the course of assembling works in a factory.

Therefore, the present invention has been made taking the foregoing actual circumstances into consideration, and an object thereof is to provide a vehicle seat slide device which is few in number of parts and which is provided with a manipulation handle capable of realizing a space-saving and enhancing the productivity.

Measures for Solving the Problem

In order to solve the aforementioned problems, the feature in construction of the invention resides in comprising a lower rail adapted to be secured to a floor of a vehicle; an upper rail adapted to be attached to a seat of the vehicle and supported slidably relative to the lower rail; a lock/unlock mechanism for locking/unlocking the upper rail relative to the lower rail; a vertical wall provided on the upper rail; and a manipulation handle pivotably carried on the vertical wall for operating the lock/unlock mechanism by being pivoted; wherein the manipulation handle comprises a grip portion; an acting end portion for operating the lock/unlock mechanism; a shaft support portion being between the acting end portion and the grip portion and formed to a flat shape to become parallel to the vertical wall; and a pivot support shaft protruding from the shaft support portion in a direction of a pivot center of the manipulation handle; and wherein the vertical wall is provided with an opened holding hole which is opened at a front part and into which the pivot support shaft is inserted from an opened portion and is supported at an inner part, and a holding member for holding the pivot support shaft in the opened holding hole.

BRIEF DESCRIPTION OF THE DRAWINGS

Hereafter, an embodiment of a vehicle seat slide device according to the present invention will be described with reference to the drawings. FIG. 1 is a perspective view showing a vehicle seat slide device assembled to a seat of a vehicle. FIG. 2 is a perspective view showing the vehicle seat slide device. The vehicle seat slide device 2 is provided with a pair of left and right lower rails 10 secured to a floor 3 of the vehicle, a pair of left and right upper rails 20 secured to the seat 5 of the vehicle, and a manipulation handle 50.

As shown in FIG. 6, the pair of lower rails 10 each have a bottom wall portion 11, a pair of side wall portions 12 extending upward from both ends of the bottom wall portion 11, and a pair of downward flange wall portions 13 which are turned down inwardly from upper ends of the side wall portions 12.

Figure 1:
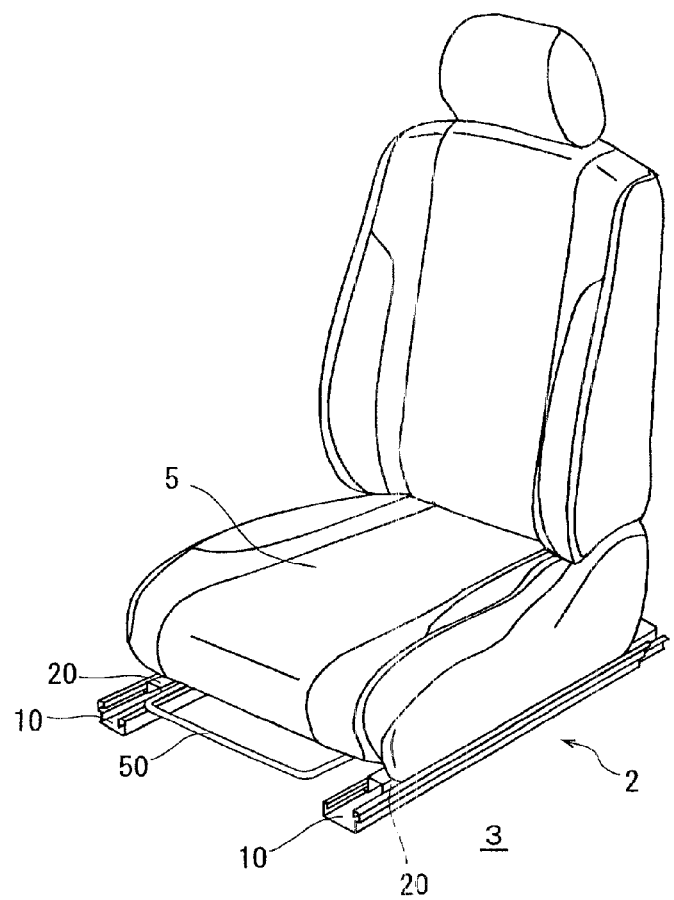
[FIG. 1] is a perspective view of a vehicle seat equipped with a vehicle seat slide device shown in an embodiment according to the present invention.

The lower rail 10 is formed by bending a piece of plate member and takes an approximately U-shape in section.

The upper rail 20 has a vertical wall portion 21 as a vertical wall, a pair of bottom wall portions 22 which are respectively bent outward from both ends of the vertical wall portion 21, and a pair of upward flange wall portions 23 which are respectively bent upward from respective outside ends of the bottom wall portions 22. The upper rail 20 is constituted by connecting two pieces of plate members, each bent to take an L-shape, together back to back.

The pair of bottom wall portions 22 of the upper rail 20 are received in the lower rail 10 so that the vertical wall portion 21 passes through between the flange wall portions 13 of the lower rail 10 and that the flange wall portions 23 are arranged between the side wall portions 12 and the flange wall portions 13 of the lower rail 10. With spaces in the rail lengthwise direction, pluralities of sliding members 24 are arranged between inner surfaces of the both side wall portions 12 of the lower rail 10 and outer surfaces of the both flange wall portions 23 of the upper rail 20, and the upper rail 20 is supported slidably relative to the lower rail 10 through the sliding members 24 in the rail lengthwise direction (the front-rear direction of the vehicle). With the sliding of the upper rails 20 relative to the lower rails 10, the position of the vehicle seat secured to the upper rails 20 is adjusted in the front-rear direction of the vehicle and is locked by a lock/Unlock mechanism, referred to later, at a desired position in the front-rear direction. Two pairs of these lower rails and the upper rails 20 are arranged in parallel with a predetermined space in the rail width direction.

Figure 7:
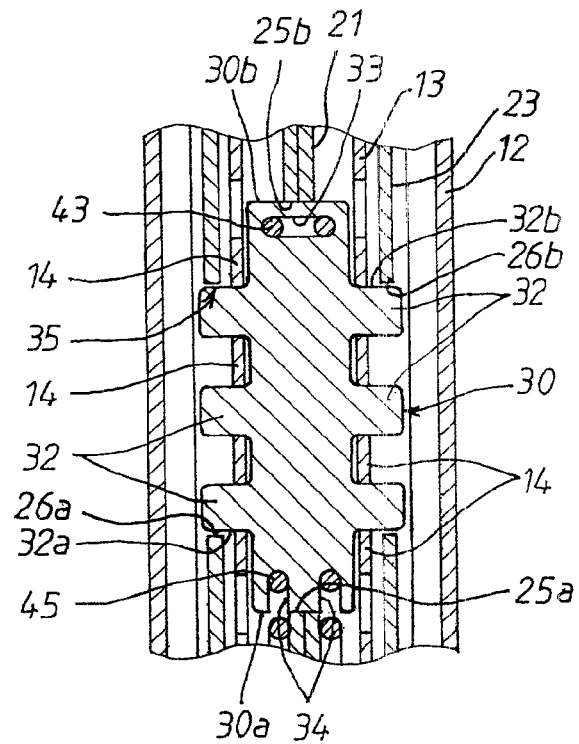
[FIG. 7] is a view showing partly in section the engagement of a lock member of the device.
Figure 8:
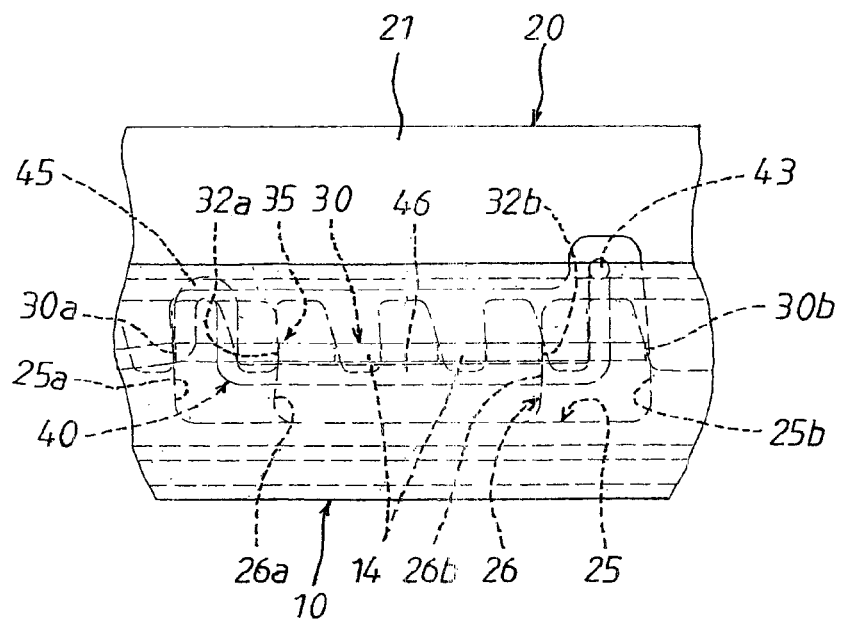
[FIG. 8] is a detailed view of a part of the device in FIG. 5.

At lower ends of the both flange wall portions 13 of the lower rail 10, as shown in FIGS. 7 and 8, pluralities of engaging claws 14 are respectively formed in the rail lengthwise direction, and a lock member 30 which is releasably engageable with the engaging claws 14 is supported by an elastic member 40 movably almost in the vertical direction. The lock member 30 takes a flat plate shape takes a symmetrical configuration to the lengthwise direction as a center and is held by the elastic member 40 in a horizontal state. The lock member 30 passes through a lock member receiving aperture 25 formed on the vertical wall portion 21 of the upper rail 20 and through cutout portions 26 formed on the both flange wall portions 23 of the upper rail 20 and extend to both sides of the upper rail 20. The lock member 30 is formed at both end portions in the rail width direction with pluralities of engaging protrusions 32 as engaging portions which are releasably engaged with the engaging claws 14 of the lower rail 10, and is also formed with an elongate engaging hole 33 at one end in the rail lengthwise direction and two rows of engaging grooves 34 at the other end in the rail lengthwise direction. The major axis of the elongate engaging hole 33 agrees to an interval covering those of straight portions 41, 42, referred to later, of the elastic member 40, while the minor axis of the elongate engaging hole 33 agrees to the diameter of a wire rod, referred to later, constituting the elastic member 40. Further, the elongate engaging hole 33 is symmetrical to a center axis along the lengthwise direction of the lock member 30. Further, the engaging grooves 34 are each cut out to take an approximately U-shape in the lengthwise direction of the lock member 30 and are formed at an interval covering those of the straight portions 41, 42. The engaging grooves 34 are formed as two rows which are symmetrical to the center axis along the lengthwise direction of the lock member 30.

As shown in FIGS. 7 and 8, end portions of the lock member receiving aperture 25 in the rail lengthwise direction are respectively formed as a front wall portion 25a and a rear wall portion 25b which are respectively slidably engaged with a front end surface 30a and a rear end surface 30b of the lock member 30 almost in the vertical direction. Further, end portions of the cutout portions 26 in the rail lengthwise direction are respectively formed as front wall portions 26a and rear wall portions 26b which respectively slidably engaged with front end surfaces 32a and rear end surfaces 32b of the engaging claws 32 protruding at both sides of the lock member 30. The respective front wall portions 25a, 26a and the respective rear wall portions 25b, 26b which are respectively formed on the lock member receiving aperture 25 and the cutout portions 26 are formed as arc surfaces which have a center on a fulcrum, referred to later, of the elastic member 40. By these front wall portions 25a, 26a and rear wall portions 25b, 26b and through the engagements of the lock member 30 with the engaging claws 14 of the lower rail 10, there is constituted a restriction portion 35 which restricts the movement of the upper rail 20 in the rail lengthwise direction.

Figure 4:
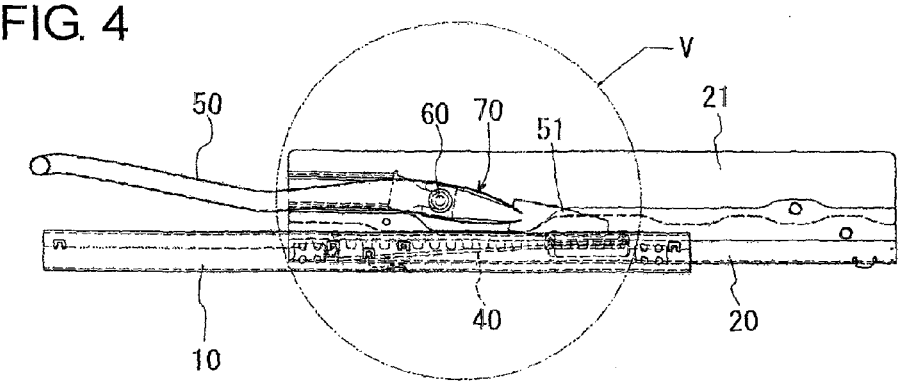
[FIG. 4] is a view as viewed in the direction of the arrow IV in FIG. 3.
Figure 5:
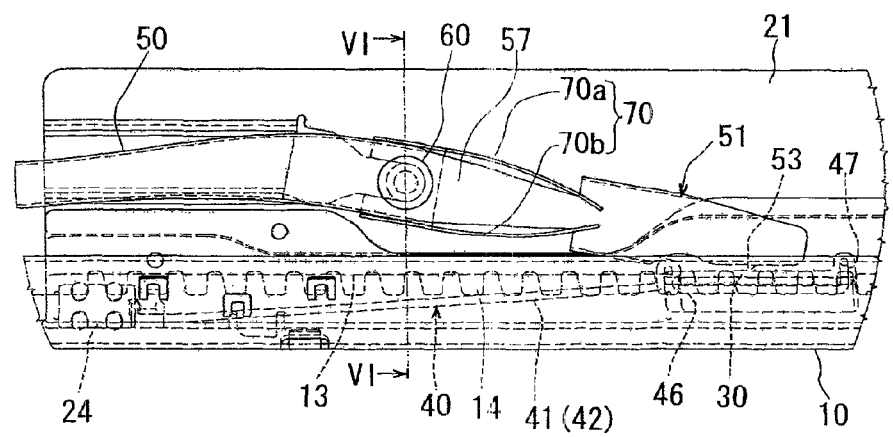
[FIG. 5] is an enlarged view of the device in FIG. 4.
Figure 9:
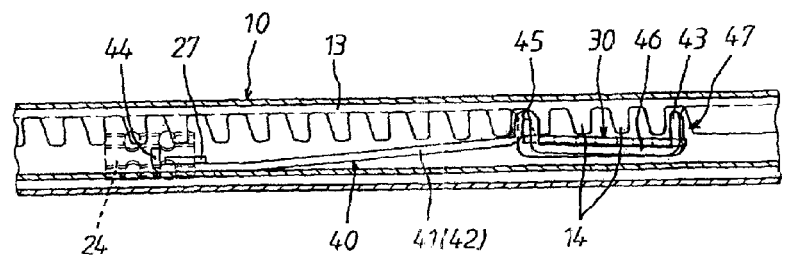
[FIG. 9] is a sectional view showing the arrangement state of an elastic member of the device.

As shown in FIGS. 4, 5 and 9, the elastic member 40 which holds the lock member 30 is formed with two straight portions 41, 42 and a turnback portion 47 connecting the respective straight portions 41, 42, by turning back a single wire rod at a center portion (refer to FIG. 9). The turnback portion 47 passes through the lock member receiving aperture 25 of the upper rail 20, while the two straight portions 41, 42 extend along the both sides of the vertical wall portion 21 of the upper rail 20. The elastic member 40 has at one end thereof engaging portions 44 constituting a holding portion (refer to FIG. 9) and has at the other end an urged portion 46 which is urged upward along the vertical wall portion 21 of the upper rail 20. That is, as shown in FIGS. 5 and 9, the elastic member 40 is formed with the two straight portions 41, 42 being in parallel with each other, by turning back the wire rod at the center portion and is formed with an end-portion protruding portion 43 by further bending the turnback portion 47 upward. Further, the end portions of the parallel straight portions 41, 42 of the wire rod are bent upward to form the engaging portions 44, and the parallel straight portions 41, 42 of the wire rod are curved to an inverted U-shape to form center protruding portions 45 which protrude upward. Thus, an urging portion 46 which holds the lock member 30 almost in the horizontal state is formed between the end-portion protruding portion 43 and the center protruding portions 45.

As shown in FIG. 7, the end-portion protruding portion 43 of the elastic member 40 is fitted in the elongate engaging hole 33 of the lock member 30, while the center protruding portions 45 are fitted in the engaging grooves 34 of the lock member 34. Thus, the lock member 30 is arranged on the urged portion 46 with itself put between the end-portion protruding portion 43 and the center protruding portions 45 in the rail lengthwise direction. On the other hand, as shown in FIG. 9, the engaging portions 44 of the elastic member 40 are engaged with engaging wall portions 27 which are formed by cutting parts around at a bottom wall portion of the vertical wall portion 21 of the upper rail 20 and by bending such parts outside. Relative to the bottom wall portions 22 of the upper rail 20, the engaging wall portions 27 extend in parallel and with clearances which each correspond to the wire diameter of the elastic member 40, and the straight portions 41, 42 of the elastic member 40 pass through the clearances to be held therein. Therefore, the elastic member 40 urges the urged portion 46 upward about the engaging portions 44 acting as a fulcrum, so that the lock member 30 held by the urged portion 46 is normally urged in a direction to engage with the engaging claws 14 of the lower rail 10. The lock/unlock mechanism is constituted mainly by the engaging claws 14, the lock member 30, the engaging protrusions 32 and the elastic member 40.

Figure 2:
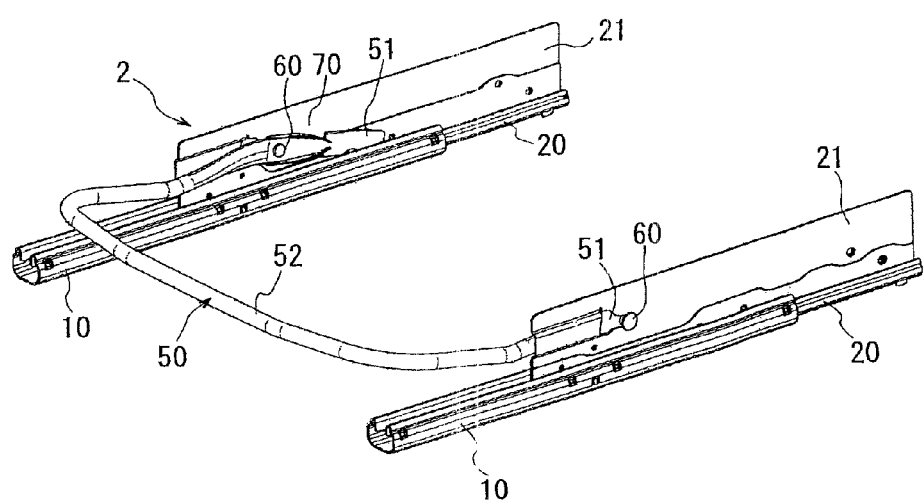
[FIG. 2] is a perspective view of the vehicle seat slide device shown in the embodiment according to the present invention.
Figure 3:
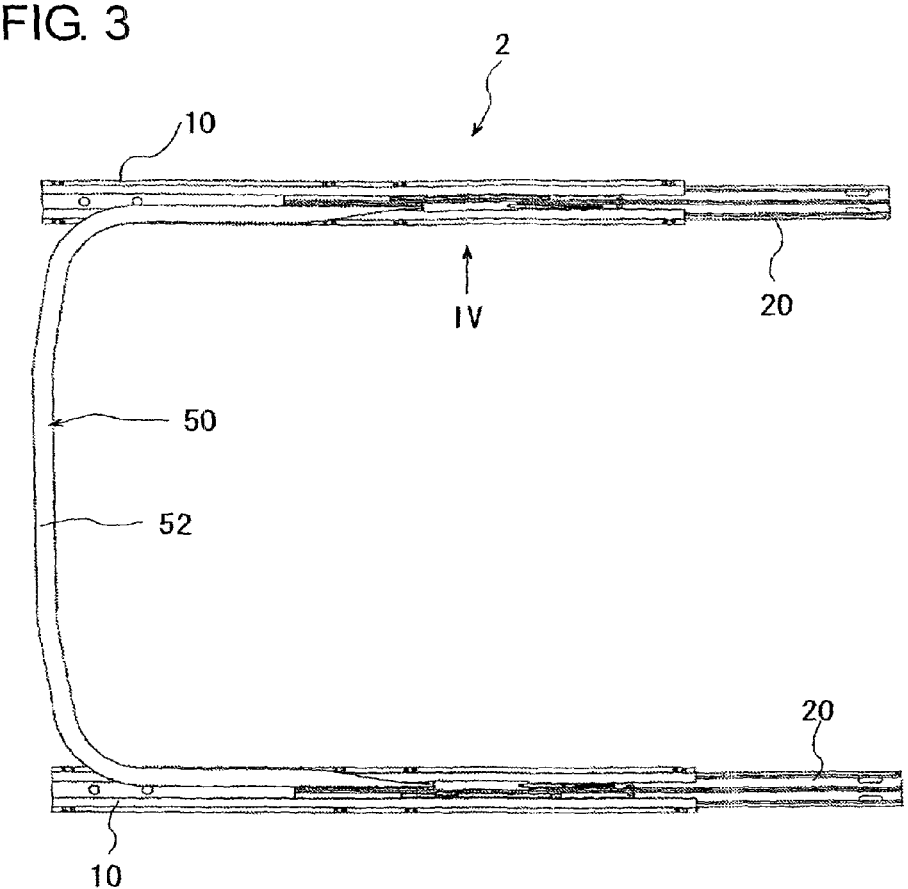
[FIG. 3] is a plan view of the device.
Figure 12:
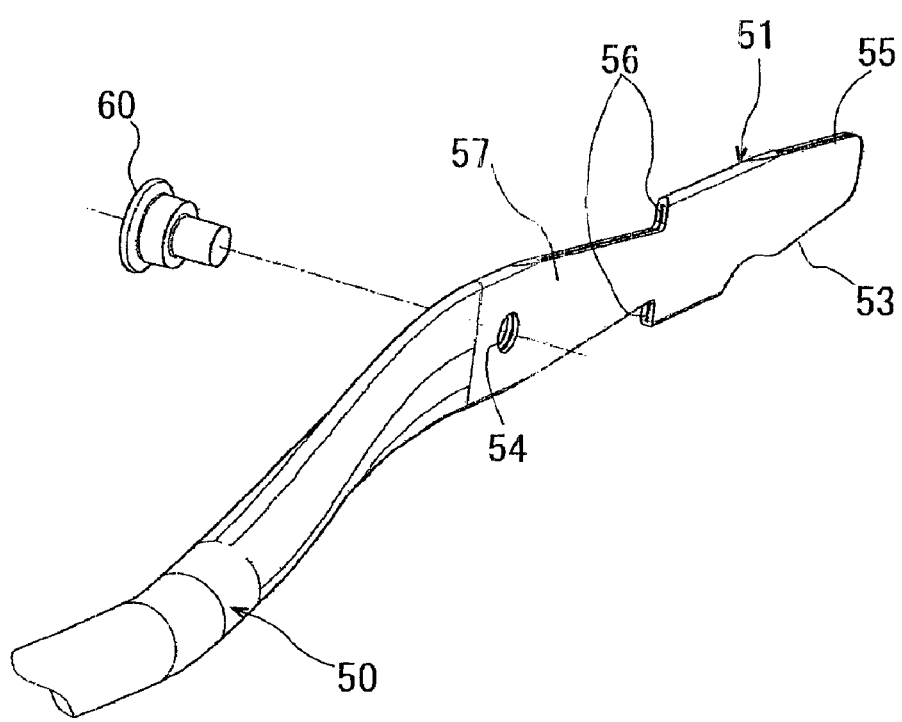
[FIG. 12] is a perspective view showing an attaching portion at an end of the manipulation handle of the device.

On the left and right upper rails 20, as shown in FIGS. 1 to 3, the manipulation handle 50 is pivotably supported at both left and right end portions 51 by support shafts 60 serving as pivot support shafts. Respective end portions of the both left and right end portions 51 of the manipulation handle are bodily connected by a handle manipulation portion 52 as a grip portion which is operated by the passenger. The both left and right end portions 51 of the manipulation handle 50 are formed to a flat shape in a direction (vertical direction) parallel to the vertical wall 21, and, as shown in FIG. 12, these both left and right end portions 51 are each formed with a shaft support portion 57 which supports the support shaft 60 about the pivot center of the manipulation handle 50, and at an rear end extending rearward, with a pressing portion 53 as an acting end portion which extends diagonally downward to come close to the upper surface of the lock member 30. The pressing portion 53 is brought into contact with an upper surface center portion of the lock member 30 by operating the handle manipulation portion 52 of the manipulation handle 50 upward and presses the lock member 30 downward against the urging force of the elastic member 40 thereby to release the engagement with the engaging claws 14 of the lower rail 10. Hereafter, description will be made regarding the specific construction that pivotably supports the manipulation handle 50 on the upper rail 20.

Figure 6:
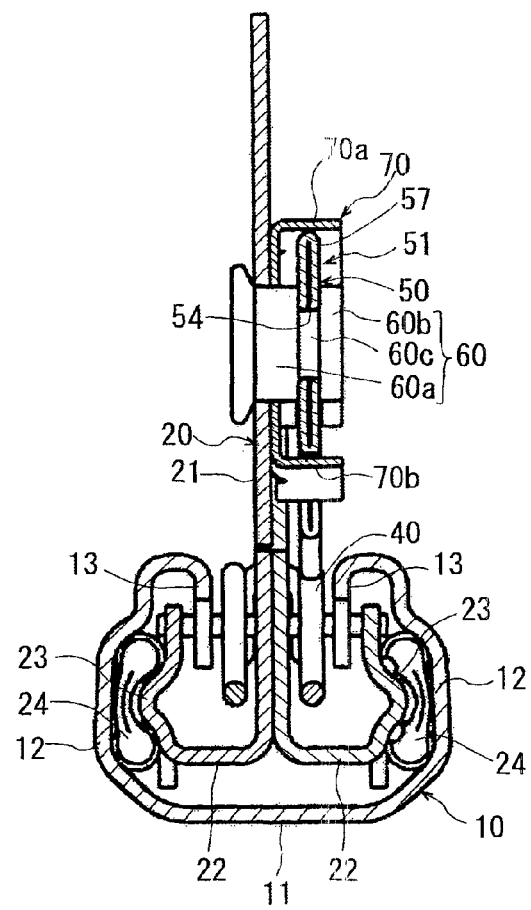
[FIG. 6] is a sectional view taken along line VI-VI of the device in FIG. 5.
Figure 11:
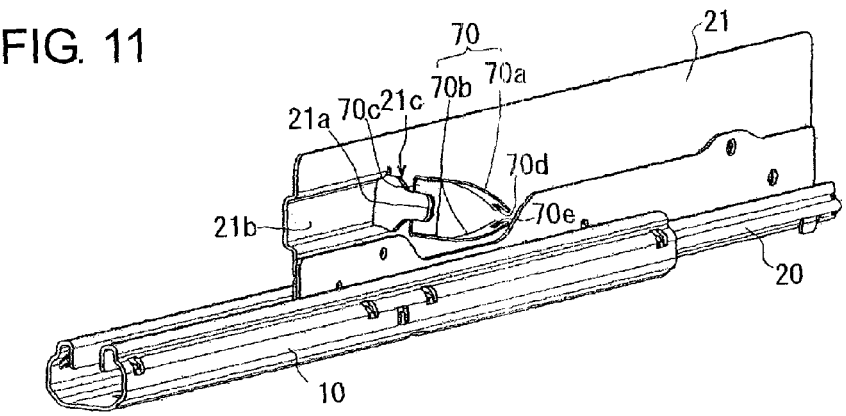
[FIG. 11] is a perspective view showing a lower rail and an upper rail of the device.

Attaching holes 54 are respectively formed on the both left and right end portions 51 of the manipulation handle 50 on the same axis, and as shown in FIGS. 6 and 12, the support shafts 60 are secured by caulking in these attaching holes 54. On each support shaft 60, a small-diameter portion 60c which is smaller in diameter than two flange portions 60a, 60b is formed between both of the flange portions 60a, 60b. As shown in FIG. 11, at a front distal end portion of the vertical wall portion 21 of each upper rail 20, an insertion guide 21b which protrudes outside is provided to extend in the rail lengthwise direction. An inner part 21c of the insertion guide 21b, inclusive of a part of the protruding portion, is cut out by pressing to form a U-shape attaching hole 21a as an opened holding hole which is opened at a front part. A handle holding spring 70 as a holding member is bodily attached by welding or the like to the U-shape attaching hole 21a, and a U-shape attaching hole 70c is also formed in the holding spring 70, and the holding spring 70 is attached to oblique rearward as a whole. The handle holding spring 70 is provided with a pair of elastically deformable leaf springs (spring members) 70a, 70b which face each other in the vertical direction. The pair of leaf springs 70a, 70b are configured to extend backward in the rail lengthwise direction and to make the space in the vertical direction narrower as they go backward. Bifurcated engaging grooves 70d, 70e are respectively provided on the distal ends of the leaf springs 70a, 70b (refer to FIG. 11), and the both left and right end portions 51 are each fitted in these engaging grooves 70d, 70e to prevent the ricketiness of the manipulation handle 50 in the left-right direction. These engaging grooves 70d, 70e correspond to a latch portion. Further, these leaf springs 70a, 70b generate elastic forces with which they are urged to come close to each other when the space therebetween is forcibly widened.

The flange portion 60a of each support shaft 60 secured to the manipulation handle 50 is designed to be engaged with these U-shape attaching holes 21a, 70c. Each of the both left and right end portions 51 of the manipulation handle 50 is formed with an oblique portion 55 which passes through by forcibly widening the pair of the leaf springs 70a, 70b when the flange portion 60a of the support shaft 60 is engaged with the U-shape attaching holes 21a, 70c, and is also formed continuously of the oblique portion 55 with step portions 56 as a latched portion which are latched by the engaging grooves 70d, 70e on the distal end portions of the pair of leaf springs 70a, 70b.

Figure 10:
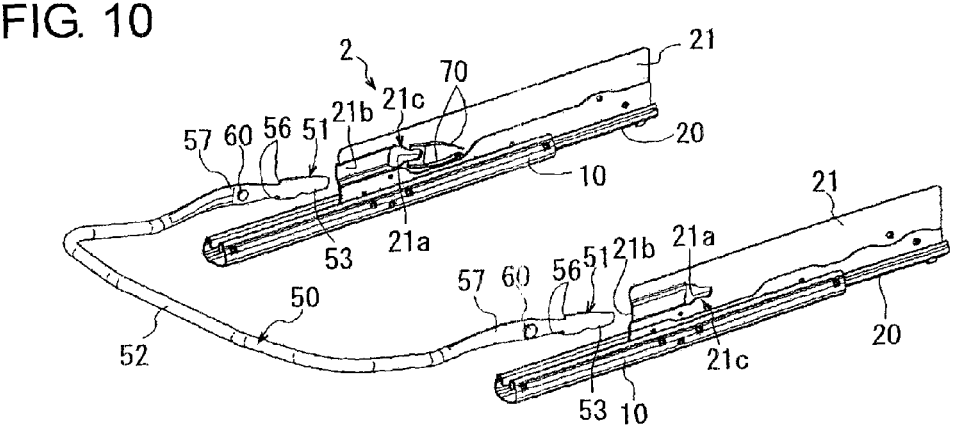
[FIG. 10] is a perspective view of the device in the state before a manipulation handle is assembled.

Thus, when the manipulation handle 50 is inserted into the U-shape attaching holes 21a of the upper rails 20 in the state shown in FIG. 10, the flange portions 60a of the support shafts 60 secured to the manipulation handle 50 are inserted to a position where they are engaged with the bottom portions of the attaching holes 21a, 70c being holding holes of the upper rails 20 as the oblique portions 55 formed at the both left and right end portions 51 of the manipulation handle 50 forcibly widen the pairs of leaf springs 70a, 70b of the handle holding springs 70. At this time, the oblique portions 55 of the manipulation handle 50 go past the pairs of leaf springs 70a, 70b, and then, the distal end portions (engaging grooves 70d, 70e) of the pairs of leaf springs 70a, 70b are elastically restored by the elastic restoration forces and are engaged with the step portions 56 as latched portions. As a result, the retraction of the manipulation handle 50 is obstructed, and the coming-off of the manipulation handle 50 can be prevented. In this manner, the manipulation handle 50 can be pivotably supported by the handle holding springs 70 on the upper rails 20 easily and reliably. The step portions 56 and the handle holding springs 70 constitute coming-off preventing mechanisms.

Further, thanks to the balance in rotational force between the forces of the pairs of leaf springs 70a, 70b each pair being urged in a direction to come close to each other and the gravity of the handle manipulation portion 52 side which protrudes through a large extent from the support shafts 60, the manipulation handle 50 so held is maintained at a predetermined angular position (neutral position) where it does not bring the lock/unlock mechanisms into the unlock state. In this state, the pressing portions 53 of the manipulation handle 50 are spaced a predetermined amount from the upper surfaces of the lock members 30 which are in engagements with the engaging claws 14 of the lower rails 10. Furthermore, the pairs of leaf springs 70a, 70b constitute main components of neutral position holding mechanisms. When in the holding state in the neutral position, the handle manipulation portion 52 of the manipulation handle 50 is operated upward against the urging forces of the pairs of leaf springs 70a, 70b, the manipulation handle 50 is pivoted about the support shafts 60 clockwise in FIG. 1. As a consequence, the pressing portions 53 of the manipulation handle 50 are moved downward and press the upper surfaces of the lock members 30 to move the lock members 30 downward against the urging forces of the elastic members 40, so that the engagements with the engaging claws 14 of the lower rails 10 can be released.

The width of the flange portion 60a formed on each support shaft 60 is determined to a dimension that the shaft support portion 57 put between the flange portions 60a, 60b on the both sides has a proper play relative to a base portion of the handle holding spring 70 attached to the vertical wall portion 21 of the upper rail 20.

As described above, in the present embodiment, each lower rail 10 receives therein the lock member 30 engaged with the engaging claws 14 of the lower rail 10 and the elastic member 40 urging the lock member 30 in the direction to engage with the engaging claws 14, and thus, no space is required on a side part of the vertical wall portion 21 of each upper rail 20. Therefore, it is possible to make the vehicle seat slide device compact in construction.

Next, description will be made regarding the operation of the vehicle seat slide device in the foregoing embodiment. Because the vehicle seat slide device in the present embodiment is left-right symmetrical in the slide structures, the following operation will be described mainly regarding one of the slide structures. In an ordinary state, as shown in FIG. 8, the lock member 30 is engaged by the urging force of the elastic member 40 with the engaging claws 14 of the lower rail 10, and thus, the movement of the upper rail 20 relative to the lower rail 10 in the rail lengthwise direction is restricted, whereby the vehicle seat supported on the upper rails 20 is positioned to a desired position.

When the handle manipulation portion 52 of the manipulation handle 50 is operated upward by the person seated, the manipulation handle 50 is pivoted clockwise in FIG. 5 about the support shaft 60 against the urging forces of the pair of leaf springs 70a, 70b. Thus, the pressing portion 53 of the manipulation handle 50 is moved downward and is brought into contact with the upper surface of the lock member 30 to move the lock member 30 downward against the urging force of the elastic member 40, whereby the engagement of the lock member 30 with the engaging claws 14 of the lower rail 10 is released.

In this state, when the position of the vehicle seat is adjusted, the upper rail 20 is slidden relative to the lower rail 10 in the rail lengthwise direction. Then, when the manipulation handle 50 is released from the hand with the vehicle seat having been adjusted to the desired position in the front-rear direction, the manipulation handle 50 is returned to the original position (neutral position) by the urging forces of the pair of leaf springs 70a, 70b of the handle holding spring 70. Thus, since the pressing portion 53 of the manipulation handle 50 is moved upward, the lock member 30 is moved upward by the urging force of the elastic member 40, and the pluralities of engaging protrusions 32 protruding from the both side portions of the lock member 30 are engaged with the engaging claws 14 formed on both of the flange wall portions 13 of the lower rail 10, whereby the movement of the upper rail 20 relative to the lower rail 10 in the rail lengthwise direction is restricted.

In this case, the lock member 30 is engaged at the front end surface 30a and the rear end surface 30b respectively with the front wall portion 25a and the rear wall portion 25b of the arc shape which are formed at the lock member receiving aperture 25 on the vertical wall portion 21 of the upper rail 20, and the front end surface 32a and the rear end surface 32b of the engaging protrusions 32 of the lock member 30 are respectively engaged with the front wall portion 26a and the rear wall portion 26b of the arc shape which are formed at the cutout portions 26 on the flange wall portions 23 of the upper rail 20. Thus, the lock member 30 is positioned to be immovable in the rail lengthwise direction, whereby it becomes possible to restrict the upper rail 20 and hence, the vehicle seat without ricketiness in the rail lengthwise direction.

In the foregoing embodiment, the manipulation handle 50 is attached at the support shafts 60 into the U-shape attaching holes 21a from the front open parts of the upper rails 20, and the manipulation handle 50 so attached is held at the position where it is pivotable smoothly. Thus, even where the manipulation handle 50 is subsequently assembled to the upper rails 20 which have been assembled on the floor of the vehicle, the assembling work can be done very efficiently. Therefore, because the left and right slide structures (upper rails and lower rails 10) are not required to be beforehand united through the manipulation handle 50 to a complete state, it does not take place that the manipulation handle 50 is damaged or deformed in the course of the assembling works in a factory. Further, since the shaft support portions 57 of the manipulation handle 50 which are placed on the vertical walls 21 of the upper rails 20 are formed to take a flat shape, a lot of space is not taken irrespective of the parts being put on each other, so that a space saving can be realized.

Further, where the manipulation handle 50 is assembled subsequently, it is possible to do the work that in the first place, the support shafts 60 are inserted just a little into the front end portions (the position adjacent to the front end portion of the vehicle seat) of the insertion guides 21b and that then, the manipulation handle 50 is slidden backward to support the support shafts 60 in the U-shape attaching holds 21a. Therefore, it is possible to make the attaching work of the manipulation handle easy and to enhance the working efficiency.

Further, at the time of attachment, the leaf springs 70a, 70b are forcibly widened by each pressing portion 53 and the like of the manipulation handle 50 in the course of insertion and then, are elastically restored in shape to latch the step portions 56 of the manipulation handle 50. As a result, it is possible to pivotably support the manipulation handle 50 on the upper rails 20 (the vertical wall portions 21) easily and reliably. Since in this way, the manipulation handle 50 is attached easily and is prevented from coming off, any particular parts and works for coming-off prevention are not required, and the attaching work can be done efficiently. Accordingly, a cost reduction can be realized with a decrease in number of pars.

Further, the leaf springs 70a, 70b have the neutral position holding function of holding the manipulation handle 50 in the neutral position, in addition to the coming-off preventing function. Therefore, since respective parts dedicated to the respective functions are not required to be provided, a cost reduction can be realized with a decrease in number of parts.

Further, with such a simple construction as the pair of leaf springs 70a, 70b, it is possible to prevent the manipulation handle 50 from coming off and to hold the same in the neutral position.

Although in the foregoing embodiment, it is designed to form to a flat shape as a whole each of the both left and right end portions 51 of the manipulation handle 50, that is, the shaft support portion 57 and the pressing portion 53 being the acting end portion, the present invention is not limited to this form. For example, the shaft support portions only may be formed to the flat shape.

Further, although the vertical wall portion (vertical wall) 21 with the U-shape attaching hole 21a formed thereon is provided on each upper rail 20 itself, the present invention is not limited to this form. For example, such vertical wall portion may be a vertical wall which is attached to a vertical part of each upper rail and which is a vertical wall (side surface portion) of a cushion frame extending from the vertical part.

Further, although the holding member for holding the manipulation handle 50 in the neutral position is constituted by the pair of leaf springs 70a, 70b which are urged in the direction to come close to each other, the present invention is not limited to this form. For example, there may be used an elastic member such as coil spring, rubber material or the like.

In addition, although the holding hole is constituted by the U-shape attaching hole 21a, the present invention is not limited to this form. For example, there may be used a V-shape attaching hole with a front end opened or a circular attaching hole with a front end opened as a result of being cutout.

Various features and many of the attendant advantages in the foregoing embodiment will be summarized as follows:

In the foregoing embodiment typically shown in FIGS. 5, 6, 10 and 11, the manipulation handle 50 is attached at the pivot support shafts 60 to the opened holding holes 21a from the front opened portion of the upper rails 20, and the attached manipulation handle 50 is held pivotably. Thus, it is possible to carry out the assembling work very efficiently. Further, as the shaft support portions 57 of the manipulation handle 50 which portions overlaps the vertical walls 21 of the upper rails 20 are formed to a flat shape, a space saving can be realized without taking a lot of space irrespective of the overlapping of the parts.

Also in the foregoing embodiment typically shown in FIGS. 10 and 11, the vertical walls 21 of the upper rails 20 are respectively provided with the insertion guides 21b which respectively serve in inserting the pivot support shafts 60 of the manipulation handle 50 from the front ends of the vertical walls 21 into the holding holes (i.e., the U-shape attaching holes) 21a. Since it is possible to do the work that in the first place, the pivot support shafts 60 are inserted a little into the front end portions (a position adjacent to the front end portion of the vehicle seat 5) of the insertion guides 21b and then, are supported by the opened holding hole 21a by sliding the manipulation handle 50 backward, it is possible to make the attaching work for the manipulation handle 50 easy and hence, to enhance the efficiency in work.

Also in the foregoing embodiment typically shown in FIGS. 10 to 12, the manipulation handle 50 is formed with the latched portions 56 and that the holding members (i.e., the handle holding springs) 70 are provided with the latch portions (i.e., the engaging grooves) 70d, 70e which are forcibly opened by the manipulation handle 50 in the course of an insertion when the pivot support shafts 60 of the manipulation handle 50 are supported in the opened holding holes 21a and which are elastically restored in shape to latch the latched portions 56 undetachably after the pivot support shafts 60 reach the inner parts 21c. That is, at the time of attachment, the latch portions 70d, 70e are forcibly opened in the course of inserting the manipulation handle 50 and then, is elastically restored in shape to effect the latching, and thus, it is possible to pivotably support the manipulation handle 50 on the upper rails 20 easily and reliably. In this manner, since the manipulation handle 50 can be attached easily and can be prevented from coming off, the attaching work can be done efficiently without needing any particular parts and works for preventing the coming-off, so that a cost reduction can be realized with a decrease in number of parts.

Also in the foregoing embodiment typically shown in FIGS. 7-9, 11 and 12, the holding members 70 have, in addition to the coming-off preventing function, the neutral position holding function of holding the manipulation handle 50 by elastic forces in the neutral position not to bring the lock/unlock mechanisms (i.e., each constituted mainly by the engaging claws 14, the lock member 30, the engaging protrusions 32 and the elastic member 40) into an unlock state. Therefore, respective parts dedicated to these functions are unnecessary to be provided, so that a cost reduction can be realized with a decrease in number of parts.

Also in the foregoing embodiment typically shown in FIGS. 5 and 11, since each of the holding members 70 is constituted by the pair of spring members 70a, 70b which are urged in the direction to come close to each other, it is possible in such a simplified construction as the pairs of spring members 70a, 70b to prevent the manipulation handle 50 from coming off and to hold the same in the neutral position.

In this manner, the specific construction described in the foregoing embodiment is no more than one that exemplifies one example of the present invention, and the present invention is not limited to such specific construction and may take various forms without departing from the gist of the invention.

INDUSTRIAL APPLICABILITY

A vehicle seat slide device according to the present invention is suitable for use in a vehicle wherein a slide mechanism for sliding a seat in a front-rear direction is locked/unlocked by a manipulation handle.

The invention claimed is:
1. A vehicle seat slide device comprising:
a lower rail configured to be secured to a floor of a vehicle;
an upper rail configured to be attached to a seat of the vehicle and supported slidably relative to the lower rail;
a lock/unlock mechanism to lock/unlock the upper rail relative to the lower rail;
a vertical wall provided on the upper rail; and
a manipulation handle pivotably carried on the vertical wall to operate the lock/unlock mechanism by being pivoted, the manipulation handle being formed with a latched portion;
wherein the manipulation handle includes
a grip portion;
an acting end portion to operate the lock/unlock mechanism;
a shaft support portion being between the acting end portion and the grip portion and formed to a flat shape to become parallel to the vertical wall; and
a pivot support shaft protruding from the shaft support portion in a direction of a pivot center of the manipulation handle; and
wherein the vertical wall is provided with an opened holding hole which is opened at a front part and into which the pivot support shaft is inserted from an opened portion and is supported at an inner part, and a holding member to hold the pivot support shaft in the opened holding hole, the holding member being provided with a latch portion which is forcibly opened by the manipulation handle in the course of an insertion when the pivot support shaft of the manipulation handle is supported in the opened holding hole and which is elastically restored in shape to latch the latched portion undetachably after the pivot support shaft reaches the inner part.

2. The vehicle seat slide device in claim 1, wherein the vertical wall of the upper rail is provided with an insertion guide which serves in inserting the pivot support shaft of the manipulation handle from a front end of the vertical wall into the holding hole.

3. The vehicle seat slide device in claim 1, wherein the holding member is provided with a neutral position holding mechanism to hold the manipulation handle by an elastic force in a neutral position not to bring the lock/unlock mechanism into an unlock state.

4. The vehicle seat slide device in claim 1, wherein the holding member includes a pair of spring members which are urged in a direction to come close to each other.

* * * * *